(12) United States Patent
Zaitsu et al.

(10) Patent No.: US 8,600,650 B2
(45) Date of Patent: Dec. 3, 2013

(54) NAVIGATION DEVICES, METHODS, AND PROGRMAS

(75) Inventors: Tomoyuki Zaitsu, Okazaki (JP); Shinji Kachi, Okazaki (JP); Kenji Nagase, Okazaki (JP); Tsuyoshi Iwata, Nagoya (JP); Toshio Inoguchi, Toyota (JP); Kazunori Watanabe, Okazaki (JP); Teruhide Hayashida, Shinagawa (JP)

(73) Assignee: Aisin AW Co., Ltd., Anjo (JP)

( * ) Notice: Subject to any disclaimer, the term of this patent is extended or adjusted under 35 U.S.C. 154(b) by 223 days.

(21) Appl. No.: 13/143,515

(22) PCT Filed: Jan. 21, 2010

(86) PCT No.: PCT/JP2010/051072
§ 371 (c)(1),
(2), (4) Date: Jul. 6, 2011

(87) PCT Pub. No.: WO2010/087382
PCT Pub. Date: Aug. 5, 2010

(65) Prior Publication Data
US 2011/0276257 A1    Nov. 10, 2011

(30) Foreign Application Priority Data
Jan. 28, 2009   (JP) .................................. 2009-016167

(51) Int. Cl.
*G06F 19/00*        (2011.01)
(52) U.S. Cl.
USPC ........... 701/117; 701/300; 701/301; 701/423; 701/411; 701/422; 340/435; 340/436; 340/440; 340/557; 340/905; 342/118; 180/169
(58) Field of Classification Search
USPC ............. 701/1, 23, 38, 51, 54, 118, 300, 301, 701/307, 411, 414, 422, 450, 482, 514; 340/435, 436, 440, 557, 905, 989, 990, 340/995.1, 995.13; 280/5.507, 5.512; 342/118; 180/169; 369/103; 345/581; 377/10; 555/22

See application file for complete search history.

(56) References Cited

U.S. PATENT DOCUMENTS 6,128,571 A * 10/2000 Ito et al. ........................ 701/426
6,426,709 B1   7/2002 Becker et al.
(Continued)

FOREIGN PATENT DOCUMENTS

CN     1517677 A    8/2004
DE   199 40 957 A1  3/2001
(Continued)

OTHER PUBLICATIONS

International Search Report dated Dec. 7, 2010 in International Application No. PCT/JP2010/051072.

(Continued)

*Primary Examiner* — McDieunel Marc
(74) *Attorney, Agent, or Firm* — Oliff & Berridge, PLC (57) ABSTRACT

When a vehicle passes through an intersection that is stored in a collection target intersection database and for which direction-specific probe information is collected, a CPU of a navigation device generates a plurality of direction-specific probe information (entry link, exit link, section travel time, and the like) from a plurality of unit distance section information that is collected within a direction-specific traffic information acquisition section until the vehicle passes through the intersection, an entry link traveled before entering the intersection; and an exit link traveled after passing through the intersection, and transmits these to an information distribution center.

7 Claims, 7 Drawing Sheets

(56) References Cited

U.S. PATENT DOCUMENTS

| | | | |
|---|---|---|---|
| 7,429,825 B2* | 9/2008 | Kubota et al. | 315/82 |
| 7,680,588 B2 | 3/2010 | Tsukamoto | |
| 7,706,942 B2* | 4/2010 | Miyajima | 701/37 |
| 7,783,420 B2* | 8/2010 | Oonishi et al. | 701/411 |
| 7,788,029 B2* | 8/2010 | Nagase et al. | 701/422 |
| 7,990,283 B2* | 8/2011 | Breed | 340/903 |
| 8,000,897 B2* | 8/2011 | Breed et al. | 701/301 |
| 8,060,308 B2* | 11/2011 | Breed | 702/3 |
| 8,068,979 B2* | 11/2011 | Breed | 701/442 |
| 8,209,120 B2* | 6/2012 | Breed | 701/450 |
| 8,260,537 B2* | 9/2012 | Breed | 701/301 |
| 2004/0183700 A1 | 9/2004 | Morie | |
| 2007/0225894 A1 | 9/2007 | Tsukamoto | |

FOREIGN PATENT DOCUMENTS

| | | |
|---|---|---|
| DE | 100 18 562 C1 | 2/2002 |
| EP | 1 413 999 A1 | 4/2004 |
| JP | A-2007-264731 | 10/2007 |
| WO | WO 2005/064565 A1 | 7/2005 |

OTHER PUBLICATIONS

Written Opinion of the International Searching Authority dated Dec. 7, 2010 in International Application No. PCT/JP2010/051072.

May 2, 2013 Chinese Search Report issued in Application No. 2010800040386 w/English Translation.

* cited by examiner

| | 81 INTERSECTION A LEFT TURN | 82 INTERSECTION A STRAIGHT | 83 RIGHT TURN | 84 INTERSECTION B LEFT TURN | 85 INTERSECTION C RIGHT TURN |
|---|---|---|---|---|---|
| ENTRY LINK | LINK #05 | LINK #05 | LINK #05 | LINK #07 | LINK #08 |
| EXIT LINK | LINK #11 | LINK #06 | LINK #12 | LINK #21 | LINK #32 |
| EXIT TIMING | 10:02:10 | 10:00:10 | 10:04:30 | 11:28:34 | 12:34:50 |
| SECTION TRAVEL TIME | 2 MIN 40 SEC | 40 SEC | 5 MIN 00 SEC | 1 MIN 10 SEC | 2 MIN 40 SEC |
| SECTION CONGESTION DEGREE | 200-METER PARTIAL CONGESTION | NO CONGESTION | 300-METER PARTIAL CONGESTION | 100-METER PARTIAL CONGESTION | 200-METER PARTIAL CONGESTION |
| THROUGH LINK | LINK #04 LINK #03 LINK #02 | LINK #04 LINK #03 LINK #02 | LINK #04 LINK #03 LINK #02 | LINK #06 | (NONE) |
| SUB SECTION TRAVEL TIME | SUB SECTION #1: 60 SEC SUB SECTION #2: 50 SEC SUB SECTION #3: 20 SEC SUB SECTION #4: 20 SEC SUB SECTION #5: 10 SEC | SUB SECTION #1: 10 SEC SUB SECTION #2: 8 SEC SUB SECTION #3: 8 SEC SUB SECTION #4: 8 SEC SUB SECTION #5: 6 SEC | SUB SECTION #1: 150 SEC SUB SECTION #2: 60 SEC SUB SECTION #3: 50 SEC SUB SECTION #4: 30 SEC SUB SECTION #5: 10 SEC | SUB SECTION #1: 40 SEC SUB SECTION #2: 10 SEC SUB SECTION #3: 8 SEC SUB SECTION #4: 6 SEC SUB SECTION #5: 6 SEC | SUB SECTION #1: 60 SEC SUB SECTION #2: 40 SEC SUB SECTION #3: 30 SEC SUB SECTION #4: 20 SEC SUB SECTION #5: 10 SEC |
| LANE CHANGE STATUS | NO LANE CHANGE | NO LANE CHANGE | NO LANE CHANGE | LANE CHANGE IN SUB SECTION #3 | NO LANE CHANGE |
| ROAD FOLLOWING | ROAD FOLLOWED | ROAD FOLLOWED | ROAD FOLLOWED | ROAD FOLLOWED | ROAD FOLLOWED |

NAVIGATION DEVICES, METHODS, AND PROGRMAS

TECHNICAL FIELD

The present invention relates to a navigation device that collects and transmits probe information to an information distribution center, a probe information transmission method, a computer-readable storage medium that stores a probe information transmission program, and a traffic information generation device that generates traffic information based on the received probe information.

BACKGROUND ART

Various related art has been proposed pertaining to navigation devices that are installed in a probe car, collect probe information, and transmit the probe information to an information distribution center. For example, a road link number that specifies the road class (expressway, general road, etc.) of a link along a past travel route of a vehicle, a link travel time, a travel speed, and the like are successively accumulated and stored for a road link (referred to as a "link" below) that is shown using road map data. There is a car navigation device constituted so as to compare a pre-stored average travel speed of the link and a real-time average travel speed of the link. Only in cases where there is a predetermined difference does the car navigation device transmit probe information such as the road link number, the link travel time, and the travel speed collected at the link to a control center (see Japanese Patent Application Publication No. JP-A-2007-264731, paragraphs 0014 to 0049 and FIGS. 1 to 4, for example).

DISCLOSURE OF THE INVENTION

The roads before entering intersections are affected by various factors such as congestion conditions on the road to be traveled after exiting the intersection, congestion conditions in the oncoming lane, and the existence of pedestrians crossing at crosswalks. Consequently, there is different congestion in each direction leaving the intersection. In other words, the travel conditions of a road before entering an intersection are affected by different congestion conditions in each exit direction of the intersection.

However, the constitution described in JP-A-2007-264731 (paragraphs 0014 to 0049 and FIGS. 1 to 4) transmits probe information for each link to the control center. Therefore, congestion in individual exit directions of the intersection may not be accurately determined for a road before entering the intersection. In other words, a section with congestion in an individual exit direction of an intersection is normally about 500 meters long. However, link lengths vary considerably depending on the link and may measure about 5,000 meters for an expressway and about 10 meters for a general road. Therefore, if the length of a link before entering an intersection (referred to as an "entry link" below) is 10 meters, for example, even though sections with congestion in an individual exit direction of an intersection are normally about 500 meters long, probe information that is used for determining congestion can only be collected for a link length of 10 meters. Consequently, there is insufficient information for determining congestion in individual exit directions of the intersection. Furthermore, an entry link that is 5,000 meters long is extremely large compared to a section that is 500 meters long with congestion in an individual exit direction of an intersection. As a consequence, the congestion in the 500-meter section may be determined as moderate based on probe information collected over the link length of 5,000 meters.

Moreover, all probe information for every link is transmitted to the control center regardless of whether there was a lane change within a link. However, there may be cases when congestion in individual exit directions of the intersection cannot be accurately determined for a road before entering the intersection. For example, in the case of congestion throughout an entire link of a straight lane and no congestion throughout an entire link of a left-turn lane, if the vehicle changed to the link of the left-turn lane after traveling the link of the straight lane, an erroneous determination of partial congestion in the left-turn lane may occur.

The present invention provides a navigation device that generates and transmits probe information regarding a section for which direction-specific congestion conditions of an intersection are accurately determined to an information distribution center, a probe information transmission method, and a computer-readable storage medium that stores a probe information transmission program. The present invention also provides a traffic information generation device that generates lane-specific traffic information for an intersection, namely direction-specific traffic information for an intersection.

A navigation device according to a first aspect of the present invention is characterized by including: a vehicle position detection unit that detects a vehicle position; a map information storage unit that stores map information; a communication unit that communicates with an information distribution center; a travel information collection unit that collects travel information for every unit distance section, including vehicle position information at a travel start time of the unit distance section, travel time information for the unit distance section, and travel link information at the travel start time of the unit distance section; an intersection passage determination unit that determines whether the vehicle passed through an intersection based on the vehicle position and the map information; an exit link identification unit that, when it is determined that the vehicle passed through an intersection by the intersection passage determination unit, identifies an exit link traveled after the vehicle passed through the intersection based on the vehicle position and the map information; a probe information generation unit that, when it is determined that the vehicle passed through an intersection by the intersection passage determination unit, generates probe information linked to the travel information collected for every unit distance section included in a predetermined distance section until passage of the intersection, an entry link traveled before entering the intersection that is identified based on the travel information, and the exit link; a lane stay determination unit that determines whether the vehicle stayed in the lane traveled at the travel start time of the predetermined distance section throughout the predetermined distance section based on the travel information included in the probe information; and a transmission control unit that, when it is determined that the vehicle stayed in the traveling lane throughout the predetermined distance section by the lane stay determination unit, executes a control so as to transmit the probe information generated by the probe information generation unit to the information distribution center through the communication unit.

A probe information transmission method according to a second aspect of the present invention is characterized by including the steps of: detecting a vehicle position; reading map information; collecting travel information for every unit distance section, including vehicle position information at a travel start time of the unit distance section, travel time information for the unit distance section, and travel link information at the travel start time of the unit distance section; determining whether the vehicle passed through an intersection based on the vehicle position and the map information; identifying, when it is determined that the vehicle passed through an intersection at the intersection passage determination step, an exit link traveled after the vehicle passed through the intersection based on the vehicle position and the map information; generating, when it is determined that the vehicle passed through an intersection at the intersection passage determination step, probe information linked to the travel information collected at the travel information collection step for every unit distance section included in a predetermined distance section until passage of the intersection, an entry link traveled before entering the intersection that is identified based on the travel information, and the exit link; determining whether the vehicle stayed in the lane traveled at the travel start time of the predetermined distance section throughout the predetermined distance section based on the travel information included in the probe information generated at the probe information generation step; and executing, when it is determined that the vehicle stayed in the traveling lane throughout the predetermined distance section at the lane stay determination step, a control so as to transmit the probe information generated at the probe information generation step to an information distribution center.

A computer-readable storage medium that stores computer-executable instructions according to a third aspect of the present invention is a program for performing the steps of: detecting a vehicle position; reading map information; collecting travel information for every unit distance section, including vehicle position information at a travel start time of the unit distance section, travel time information for the unit distance section, and travel link information at the travel start time of the unit distance section; determining whether the vehicle passed through an intersection based on the vehicle position and the map information; identifying, when it is determined that the vehicle passed through an intersection at the intersection passage determination step, an exit link traveled after the vehicle passed through the intersection based on the vehicle position and the map information; generating, when it is determined that the vehicle passed through an intersection at the intersection passage determination step, probe information linked to the travel information collected at the travel information collection step for every unit distance section included in a predetermined distance section until passage of the intersection, an entry link traveled before entering the intersection that is identified based on the travel information, and the exit link; determining whether the vehicle stayed in the lane traveled at the travel start time of the predetermined distance section throughout the predetermined distance section based on the travel information included in the probe information generated at the probe information generation step; and executing, when it is determined that the vehicle stayed in the traveling lane throughout the predetermined distance section at the lane stay determination step, a control so as to transmit the probe information generated at the probe information generation step to the information distribution center.

A traffic information generation device according to a fourth aspect of the present invention is characterized by including: a receiver unit that receives probe information from a vehicle for which travel information for every unit distance section is collected, the travel information including vehicle position information at a travel start time of the unit distance section, travel time information for the unit distance section, and travel link information at the travel start time of the unit distance section, with such probe information transmitted each time the vehicle passes through an intersection and linked to the travel information that is collected for every unit distance section included in a predetermined distance section until passage of the intersection, an entry link traveled before entering the intersection that is identified based on the travel information, and an exit link traveled after passing through the intersection; a lane stay determination unit that determines whether the vehicle stayed in the lane traveled at the travel start time of the predetermined distance section throughout the predetermined distance section based on the travel information included in the probe information; and a traffic information generation unit that, when it is determined that the vehicle stayed in the traveling lane throughout the predetermined distance section, generates lane-specific traffic information for the intersection based on the probe information.

According to the first, second, and third aspects of the present invention, when an intersection is passed, probe information can be generated that is linked to the travel information collected for every unit distance section included in a predetermined distance section until passage of the intersection, an entry link traveled before entering the intersection that is identified based on the travel information, and an exit link traveled after passing through the intersection, and can be transmitted to the information distribution center.

The navigation device can generate probe information regarding a section for which the congestion conditions at an intersection in an individual direction of travel from the intersection are accurately determined based on the travel information collected for every unit distance section included in a predetermined distance section until passage of the intersection, the entry link, and the exit link, and transmit the direction-specific probe information to the information distribution center. Probe information is transmitted to the information distribution center only when it is determined that the vehicle stayed in the lane traveled at the travel start time of the predetermined distance section throughout the predetermined distance section. Therefore, only probe information that accurately reflects the congestion conditions in individual exit directions from the intersection can be transmitted to the information distribution center. Further, the information distribution center can accurately determine the congestion conditions for individual exit directions from every intersection by utilizing the received probe information, and can generate and distribute accurate current traffic information regarding the intersections to each navigation device.

According to the fourth aspect of the present invention, the lane-specific traffic information can be generated for an intersection based on probe information received from the vehicle that is linked to the travel information collected for every unit distance section included in a predetermined distance section until passage of the intersection, an entry link traveled before entering the intersection, and an exit link traveled after passing through the intersection. Lane-specific traffic information is generated for an intersection based on probe information only when it is determined that the vehicle stayed in the lane traveled at the travel start time of the predetermined distance section throughout the predetermined distance section until passage of the intersection. Therefore, traffic information that accurately shows the congestion conditions in individual exit directions from the intersection can be generated.

BEST MODE FOR CARRYING OUT THE INVENTION

A navigation device, a probe information transmission method and a computer-readable storage medium that stores a probe information transmission program according to the present invention will be described in detail below on the basis of a specific embodiment of a navigation system and with reference to the drawings.

Figure 1:
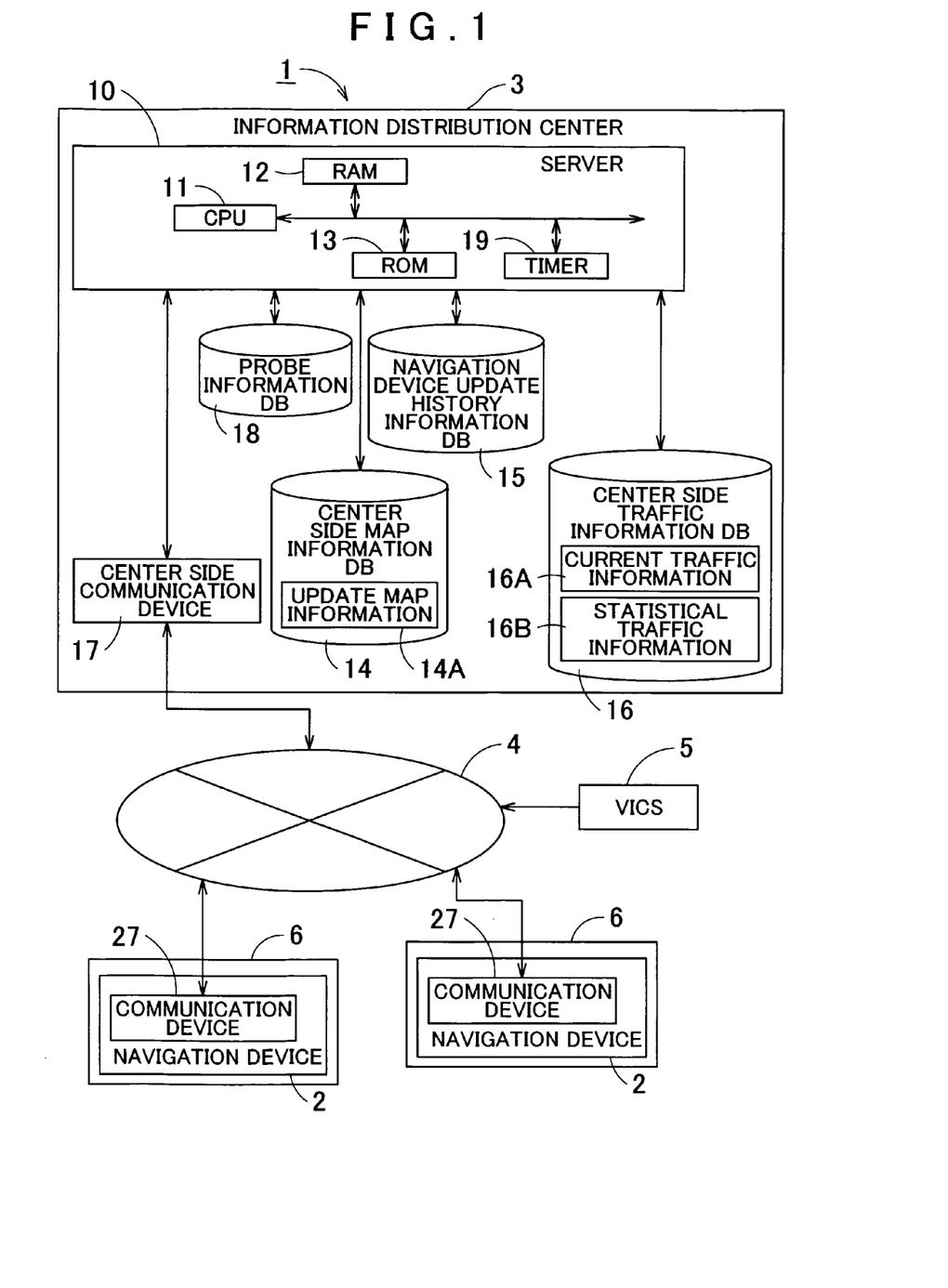
FIG. 1 is a block diagram showing a navigation system according to an embodiment.

First, the schematic constitution of a navigation system 1 according to the present embodiment will be described using FIG. 1. FIG. 1 is a block diagram showing the navigation system 1 according to the present embodiment.

As shown in FIG. 1, the navigation system 1 according to the present embodiment is basically constituted by a navigation device 2 installed in probe cars 6; an information distribution center 3 that distributes current traffic information generated from update information for updating map information, direction-specific probe information described later that is stored in a probe information database (probe information DB) 18, and the like to the navigation device 2; and a network 4. The navigation device 2 and the information distribution center 3 are capable of transmitting and receiving various information via the network 4. The constitution of the navigation device 2 will be described in detail later using FIG. 2.

Further, as the network 4, a communication system of any communication network such as a cellular telephone network, a telephone network, a public communication network, a private communication network, and the Internet may be used, for example. A vehicle information and communication system (VICS; registered trademark) 5 is also connected to the network 4. The navigation device 2 and the information distribution center 3 are constituted to be capable of receiving traffic information such as information relating to road congestion or the like and traffic restriction information, which is created by collecting information from a traffic control system of the police or the Japan Highway Public Corporation, via the network 4 at predetermined time intervals.

As shown in FIG. 1, the information distribution center 3 has a server 10; a center side map information database (center side map information DB) 14 serving as a map information storage unit connected to the server 10; a navigation device update history information database (navigation device update history information DB) 15; a center side traffic information database (center side traffic information DB) 16; a center side communication device 17; and the probe information DB 18.

The server 10 has a CPU 11 serving as a computing device and a control device that performs an overall control of the server 10, as well as internal storage devices such as a RAM 12 and a ROM 13, and a timer 19 that measures time. The RAM 12 is used by the CPU 11 as a working memory when performing various computational processing. The ROM 13 stores various control programs for performing processing such as current traffic information distribution processing that distributes to the navigation device 2 traffic information regarding current conditions via the network 4, and map information update processing that, based on a request from the navigation device 2, extracts from the center side map information DB 14 update information, which is used for updating map information in a predetermined area to a new version of map information, among map information stored in the navigation device 2.

The probe information DB 18 stores direction-specific probe information or the like, which is transmitted from the navigation device 2 installed in the probe car 6 each time a predetermined intersection is passed. The center side traffic information DB 16 stores direction-specific probe information collected by the navigation device 2 installed in the probe car 6, and current traffic information 16A that is information relating to current road congestion or the like created by collecting traffic information received from the vehicle information and communication system 5.

The center side traffic information DB 16 also stores statistical traffic information 16B generated on the basis of VICS signals from the vehicle information and communication system 5, and past traffic information such as direction-specific probe information collected from the probe cars 6. When a request is issued from the navigation device 2, the center side traffic information DB 16 selects and distributes traffic information relating to a section of road between two intersections, the statistical traffic information 16B or the like on the basis of the current traffic information 16A stored in the center side traffic information DB 16.

Figure 2:
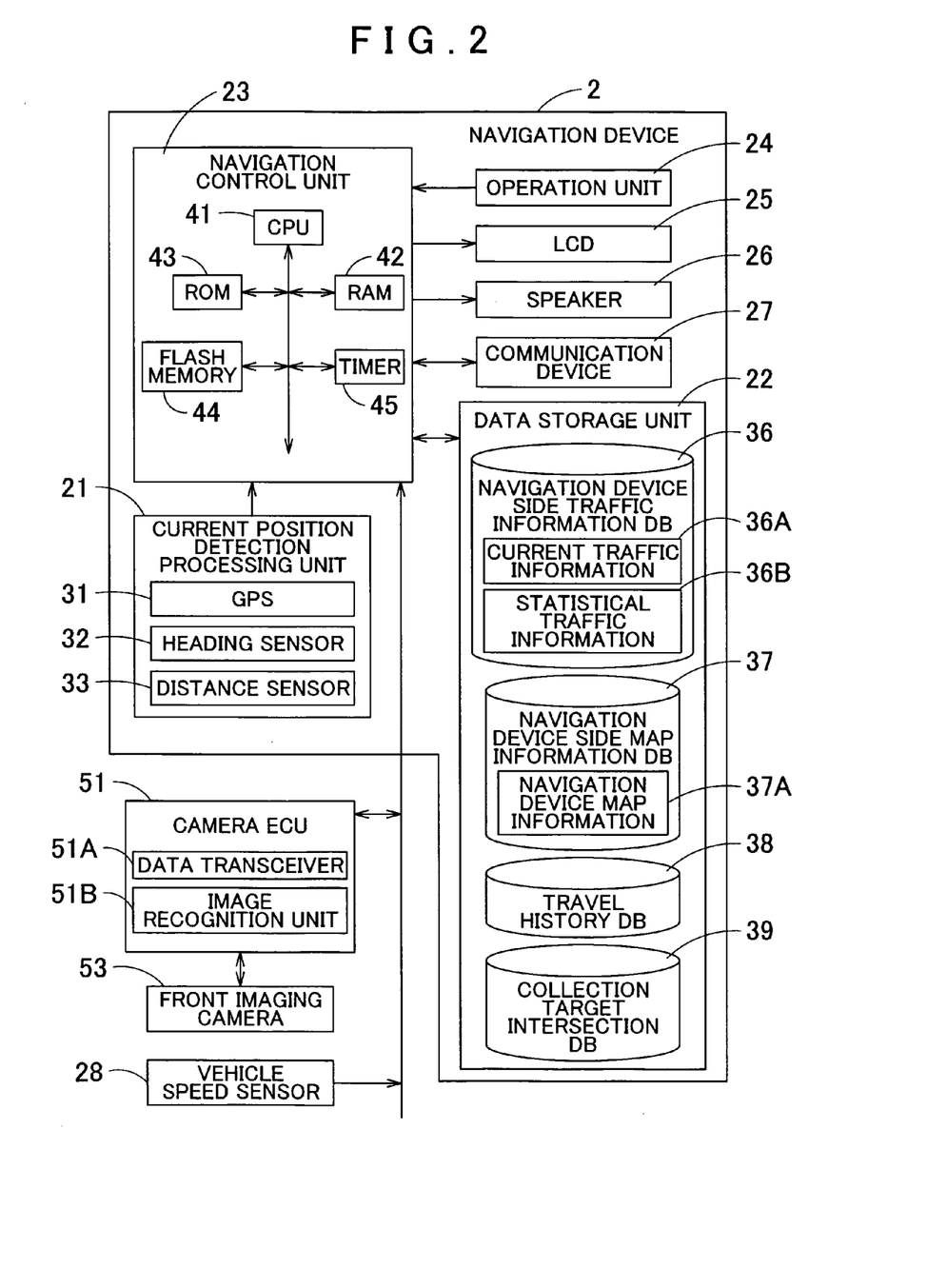
FIG. 2 is a block diagram showing a navigation device of the navigation system.

Next, the schematic constitution of the navigation device 2 provided in the navigation system 1 according to the present embodiment will be described using FIG. 2. FIG. 2 is a block diagram showing the navigation device 2 according to the present embodiment.

As shown in FIG. 2, the navigation device 2 according to the present embodiment is constituted by the following: a current position detection processing unit 21 that detects a current position of the vehicle; a data storage unit 22 in which various data is recorded; a navigation control unit 23 that performs various computational processing based on input information; an operating portion 24 that accepts an operation from a user; a liquid crystal display 25 that shows information such as a map to the user; a speaker 26 that outputs voice guidance related to route guidance; and a communication device 27 that enables communication among the vehicle information and communication system 5, the information distribution center 3 and so forth via a cellular telephone network or the like. A vehicle speed sensor 28 that detects the travel speed of the vehicle is connected to the navigation control unit 23.

The navigation control unit 23 is also electrically connected to a camera electronic control unit (ECU) 51 that drivingly controls a CCD camera or the like. A front imaging camera 53 that is constituted by a CCD camera or the like attached to an end portion of the vehicle and continuously images the road surface in front of the vehicle is electrically connected to the camera ECU 51. Note that the CCD camera or the like may be provided in the vicinity of a rearview mirror and continuously image the road surface in front of the vehicle.

The camera ECU 51 has a CPU, a ROM, and a RAM not shown in the drawing, and also includes a data transceiver 51A that transmits and receives control information to and from the navigation control unit 23, as well as an image recognition unit 51B that performs image recognition of images taken by the front imaging camera 53. The camera ECU 51 detects a lane division line from images continuously taken of the road surface by the front imaging camera 53 to determine whether a lane change occurred. If it is determined that the vehicle changed lanes, the camera ECU 51 transmits notification of the lane change to the navigation control unit 23.

In the description below regarding the structural elements that constitute the navigation device 2, the current position detection processing unit 21 is formed from a GPS 31, a heading sensor 32, a distance sensor 33 and the like, and is capable of detecting the current position, heading, and travel distance of the vehicle.

The data storage unit 22 has a hard disk (not shown) serving as an external storage device and storage medium, and a read-write head (not shown) serving as a drive for reading a navigation device side traffic information database (navigation device side traffic information DB) 36, a navigation device side map information database (navigation device side map information DB) 37, a travel history database (travel history DB) 38, a collection target intersection database (collection target intersection DB) 39, predetermined programs, and so on from the hard disk and writing predetermined data to the hard disk.

Here, the navigation device side traffic information DB 36 stores current traffic information 36A. The current traffic information 36A is generated from traffic information such as road congestion information relating to current road congestion or the like, which is constituted by actual congestion length, required time, congestion cause, and estimated time until the end of congestion as received from the information distribution center 3 and the vehicle information and communication system 5, and traffic restriction information based on road work, construction work, and the like.

The statistical traffic information 36B of the navigation device side traffic information DB 36 stores the above statistical traffic information 16B distributed from the information distribution center 3 via the communication device 27. The contents of the statistical traffic information 16B stored in the statistical traffic information 36B are updated by downloading the update information distributed from the information distribution center 3 via the communication device 27.

The navigation device side map information DB 37 also stores navigation device map information 37A that is used by the navigation device 2 during travel guidance and route searching and updated by the information distribution center 3. Here, the navigation map information 37A is constituted by various types of information required for route guidance and map display, similar to the updating map information 14A, including new road information for specifying new roads, map display data for displaying a map, intersection data relating to intersections such as branch points of expressways and intersections of general roads such as national and prefectural roads, node data relating to node points, link data relating to roads (links), search data for finding a route, store data relating to points of interest (POIs) such as stores, which are a type of facility, and search data for finding a location. The content of the navigation device side map information DB 37 is updated by downloading update information distributed from the information distribution center 3 via the communication device 27.

The travel history DB 38 successively records unit distance section information (e.g. travel start time of the unit distance section, travel end time of the unit distance section, vehicle position at the travel start time of the unit distance section, travel time of the unit distance section, link ID at the travel start time of the unit distance section, and whether a lane change occurred) every time the vehicle travels a unit distance section (e.g. a section whose length is approximately 10 meters).

The collection target intersection DB 39 stores intersection information (such as coordinate position, link IDs of links with intersections at end points, and number of lanes) relating to, for example, the branch points of expressways such as motorways and urban expressways, intersections where national roads cross, intersections where national and prefectural roads cross, intersections where roads with two or more lanes cross, and intersections with right-turn lanes, as intersections for which direction-specific probe information is to be collected. The content of the navigation device side map information DB 39 is updated by downloading update information distributed from the information distribution center 3 via the communication device 27. Note that the intersection information is linked to the navigation device map information 37A stored in the navigation device side map information DB 37.

When an intersection stored in the collection target intersection DB 39 is passed, the navigation device 2 installed in the probe car 6 generates direction-specific probe information from the plurality of unit distance section information stored in the travel history DB 38 and transmits this to the information distribution center 3 via the communication device 27 (see FIG. 3), as described later.

Further, as shown in FIG. 2, the navigation control unit 23 of the navigation device 2 has a CPU 41 serving as a computation device and a control device that performs overall control of the navigation device 2; a RAM 42 that is used as a working memory when the CPU 41 performs various types of computational processing and stores route data generated when searching for a route; a ROM 43 that stores control programs and a direction-specific probe information transmission processing program described later that generates and transmits direction-specific probe information to the information distribution center 3 when an intersection stored in the collection target intersection DB 39 is passed (see FIG. 3); an internal storage device such as a flash memory 44 for storing programs read from the ROM 43; and a timer 45 for measuring time.

In the present embodiment, various programs are stored in the ROM 43 and various data are stored in the data storage unit 22. However, these programs, data, and so on may be read from the same external storage device, memory card, or the like and written to the flash memory 44. Furthermore, by exchanging the memory card or the like, the programs, data, and so on may be updated.

Peripheral devices (actuators) for the operation unit 24, the liquid crystal display 25, the speaker 26, and the communication device 27 are electrically connected to the navigation control unit 23.

The operation unit 24 is constituted by various types of keys and a plurality of operating switches. The operation unit 24 is operated to correct the current position when travel starts, to input a departure point as a guidance start point, to input a destination as a guidance end point, and to perform a search for information relating to facilities, and so on. On the basis of switch signals output by depressing the switches or the like, the navigation control unit 23 performs controls to execute various corresponding operations. The front surface of the liquid crystal display 25 is provided with a touch panel, and various instruction commands can be input by depressing a button displayed on the screen.

In addition to a map based on the navigation device map information 37A and a route guidance screen displaying traffic information on each link, the liquid crystal display 25 also displays operation guidance, an operation menu, key guidance, a recommended route from the current location to the destination, guidance information along the recommended route, traffic information, news, weather forecasts, the time, mail, television programs, and so on. The speaker 26 outputs voice guidance and so on for guiding traveling along the recommended route on the basis of an instruction from the navigation control unit 23. Here, examples of the voice guidance include "turn right at intersection XX in 200 meters".

The communication device 27 is a communicating unit that performs communication with the information distribution center 3 via a cellular telephone network or the like, and transmits and receives the latest version of the update map information and the current traffic information to and from the information distribution center 3. In addition to receiving information from the information distribution center 3, the communication device 27 also receives traffic information that is transmitted from the vehicle information and communication system 5 or the like and includes various types of information such as congestion information, restriction information, parking information, traffic accident information, and service area congestion information.

Figure 3:
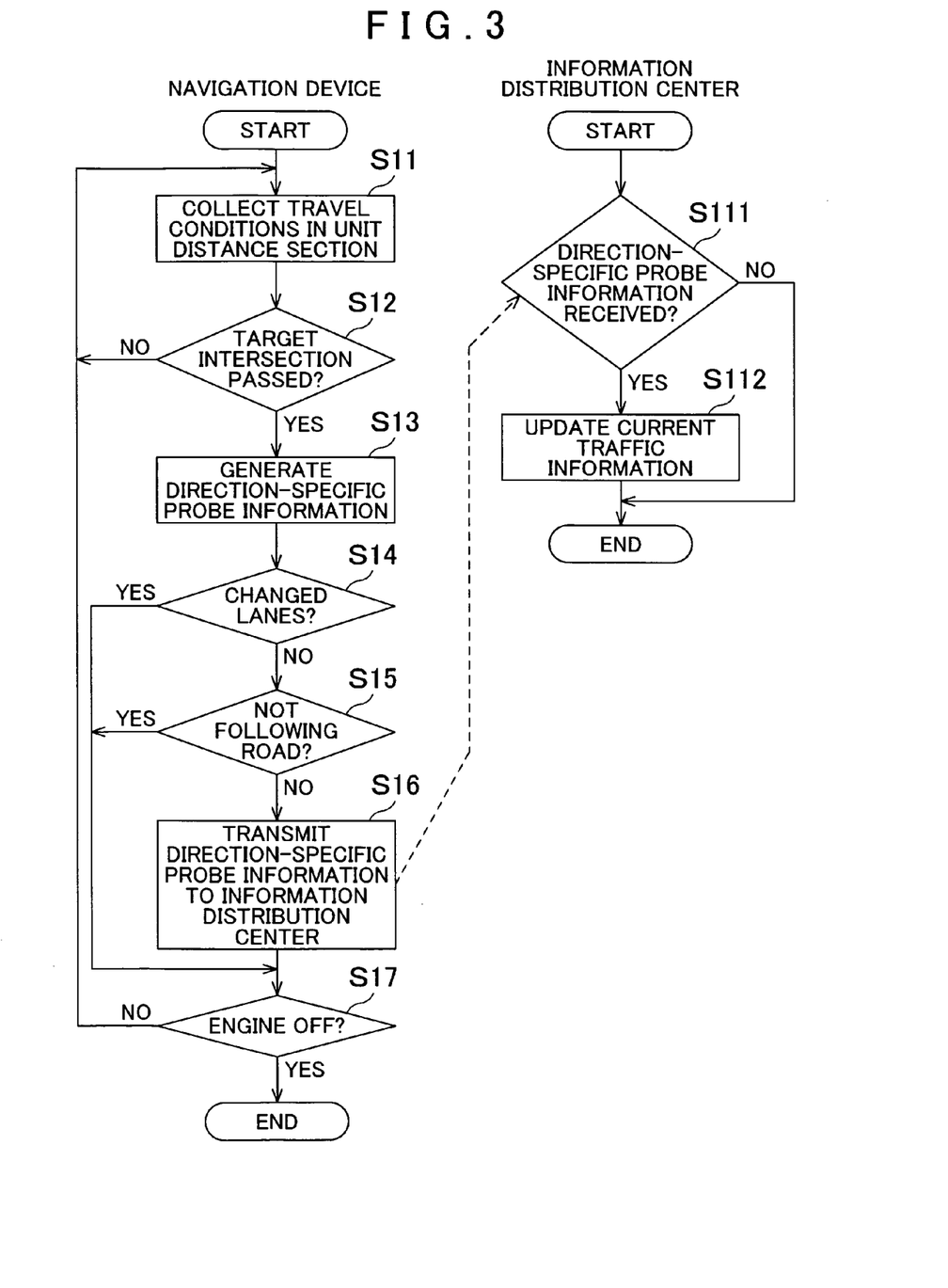
FIG. 3 is a flowchart showing direction-specific probe information transmission processing executed by the navigation device installed in a probe car and direction-specific probe information storage processing executed by an information distribution center of the navigation system.

Next, in the navigation system 1, direction-specific probe information transmission processing, wherein the CPU 41 of the navigation device 2 generates and transmits direction-specific probe information to the information distribution center 3 when an intersection stored in the collection target intersection DB 39 is passed, and direction-specific probe information storage processing, which is executed by the CPU 11 of the information distribution center 3 when direction-specific probe information is received from the navigation device 2, will be described using FIGS. 3 to 6. FIG. 3 is a flowchart showing the direction-specific probe information transmission processing executed by the navigation device 2 installed in the probe car 6 and the direction-specific probe information storage processing executed by the information distribution center 3 of the navigation system 1.

First, the direction-specific probe information transmission processing executed by the CPU 41 of the navigation device 2 installed in the probe car 6 will be described based on FIG. 3. Note that the program shown at S11 to S17 of the flowchart in FIG. 3 is stored in the ROM 43 provided in the navigation device 2 and is executed by the CPU 41.

As shown in FIG. 3, first at step (abbreviated to S below) 11, based on the detection result of the current position detection processing unit 11, the navigation device map information 37A, the image processing result of the road surface ahead from the camera ECU 51, and so on, the CPU 41 collects information relating to travel conditions for every unit distance section (e.g. a section whose length is approximately 10 meters) and stores this information in the travel history DB 38. For example, the CPU 41 collects and temporarily stores in the RAM 42 information such as the travel start time of the unit distance section, the travel end time of the unit distance section, the travel time of the unit distance section, the vehicle position at the travel start time of the unit distance section, the link ID of the link where the vehicle is located at the travel start time of the unit distance section, and whether a lane change was detected by image recognition within the unit distance section. The collected information relating to travel conditions is time-sequentially stored in the travel history DB 38 as unit distance section information that corresponds to the unit distance section.

Note that the CPU 41 may serially update and store only unit distance section information for particular unit distance sections included within at least a predetermined distance (e.g. a distance of approximately 500 meters) from the current vehicle position in the travel history DB 38.

Next, at S12, the CPU 41 detects the current position of the vehicle based on the detection result of the current position detection processing unit 11 and stores this in the RAM 42. If the vehicle position is beyond an intersection based on the navigation device map information 37A, the CPU 41 stores intersection information relating to the intersection as passed intersection information in the RAM 42. The CPU 41 then determines whether the intersection corresponding to the passed intersection information is stored in the collection target intersection DB 39. That is, the CPU 41 executes determination processing to determine whether the vehicle passed an intersection that is stored in the collection target intersection DB 39 and for which direction-specific probe information is collected.

If the vehicle did not pass an intersection that is stored in the collection target intersection DB 39 and for which direction-specific probe information is collected (NO at S12), the CPU 41 executes the processing at S11 onward again. However, if the vehicle did pass an intersection that is stored in the collection target intersection DB 39 and for which direction-specific probe information is collected (YES at S12), the CPU 41 proceeds to the processing at S13.

At S13, the CPU 41 generates direction-specific probe information relating to the passed intersection and stores this in the RAM 42. Specifically, first, the CPU 41 sets a predetermined distance to passage of the intersection (e.g. under approximately 500 meters) as a direction-specific traffic information acquisition section. The CPU 41 then detects the vehicle position based on the detection result of the current position detection processing unit 11, reads the link ID of the link traveled after passing the intersection from the navigation device map information 37A, and stores this as an exit link in the RAM 42.

Figure 4:
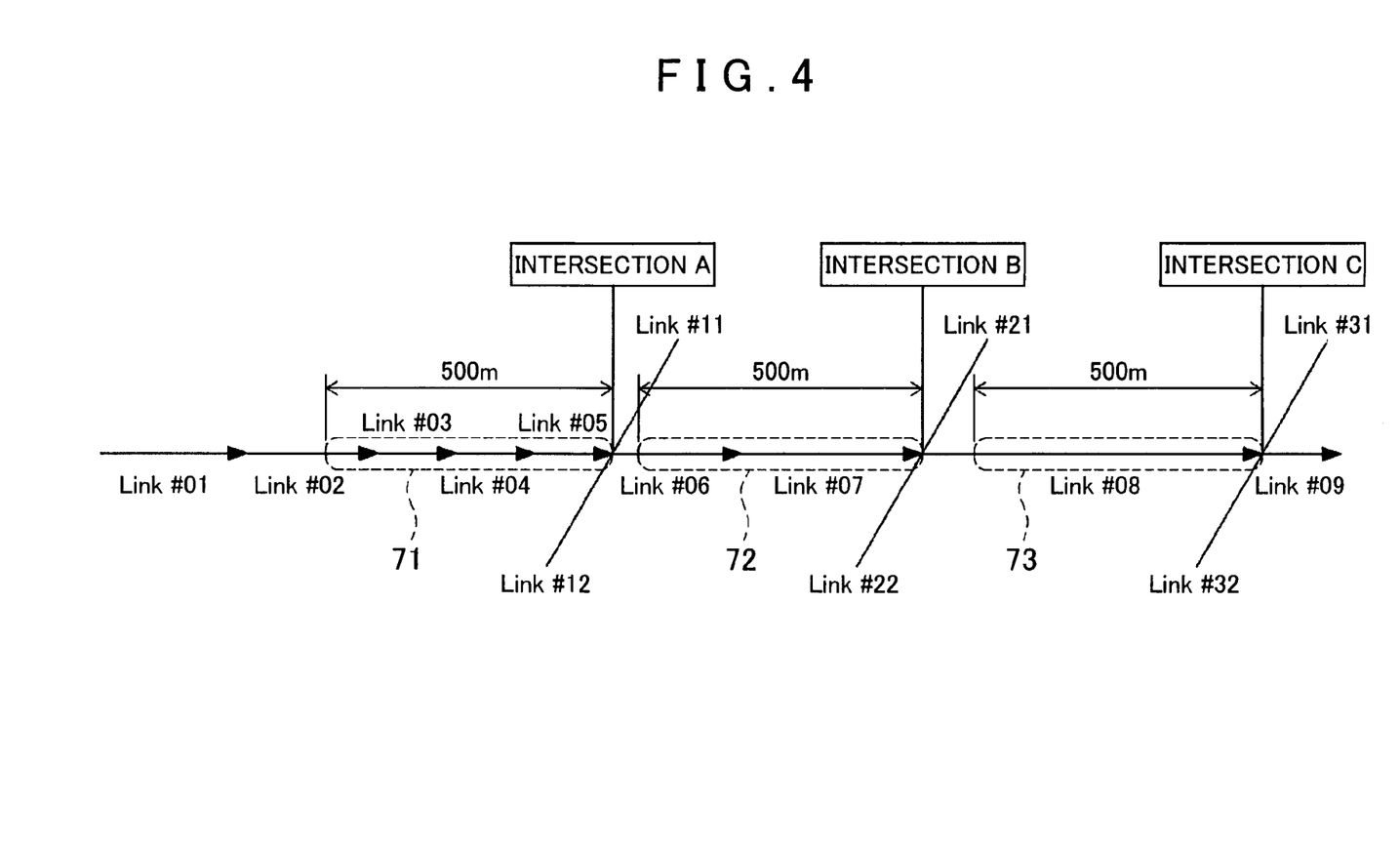
FIG. 4 is a drawing showing an example of a direction-specific traffic information acquisition section.

An example of the direction-specific traffic information acquisition section will now be described using FIG. 4. FIG. 4 is a drawing showing an example of a direction-specific traffic information acquisition section. As shown in FIG. 4, if an intersection A is stored in the collection target intersection DB 39, the CPU 41 sets a section that includes the links #02 to #05 which are within approximately 500 meters of the intersection A as a traffic information acquisition section 71. End points of the links #05, #11, #06, #12 are connected to the intersection A.

If an intersection B is stored in the collection target intersection DB 39, the CPU 41 sets a section that includes the links #06, #07 which are within approximately 500 meters of the intersection B as a traffic information acquisition section 72. End points of the links #07, #21, #08, #22 are connected to the intersection B.

If an intersection C is stored in the collection target intersection DB 39, the CPU 41 sets a section that includes the link #08 which is within approximately 500 meters of the intersection C as a traffic information acquisition section 73. End points of the links #08, #31, #09, #32 are connected to the intersection C.

The CPU 41 serially reads the plurality of unit distance section information collected in the direction-specific traffic information acquisition section from the travel history DB 38 and reads the link ID of the exit link from the RAM 42. The CPU 41 then generates direction-specific probe information that is constituted by items including entry link, exit link, exit time, section travel time, sub section travel time, section congestion degree, through link, lane change status, and road following, and stores this in the RAM 42.

Figure 5:
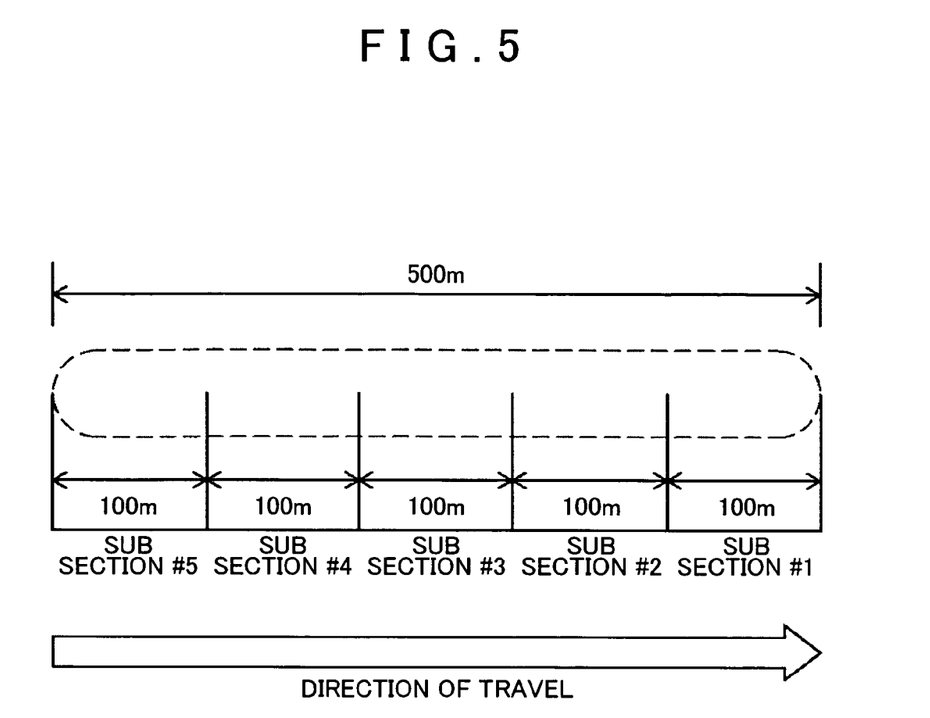
FIG. 5 is a drawing showing an example of a direction-specific traffic information acquisition section divided into five sub sections.
Figure 6:
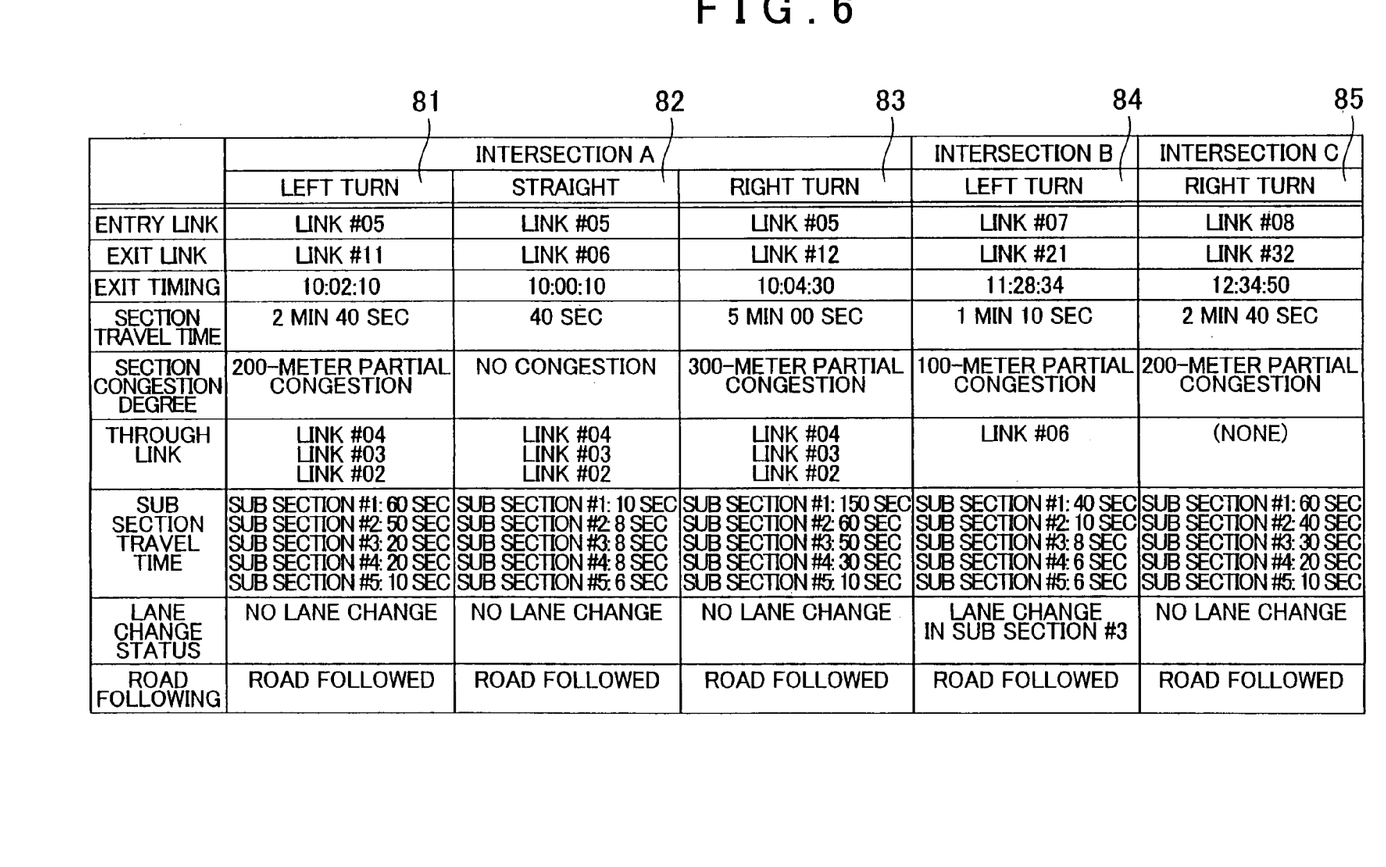
FIG. 6 is a drawing showing an example of direction-specific probe information generated at intersections A, B, C shown in FIG. 4.

Structural elements of the direction-specific probe information and an example thereof will be described next using FIGS. 4 to 6. FIG. 5 is a drawing showing an example of a direction-specific traffic information acquisition section divided into five sub sections #1 to #5. FIG. 6 is a drawing showing an example of direction-specific probe information generated at the intersections A, B, C shown in FIG. 4.

The entry link of the direction-specific probe information is the link ID of the link traveled before entering the intersection. Specifically, the entry link is the link ID of the link where the vehicle is located at the travel start time of a unit distance section for which the unit distance section information is last collected among the plurality of unit distance section information collected within the direction-specific traffic information acquisition section read from the travel history DB 38.

The exit link is the link ID of the link traveled after passing through the intersection. In other words, the exit link can be used to detect the direction of travel after passing through the intersection. Therefore, depending on the combination of entry link and exit link, the intersection traveled by the probe car 6 and the exit direction at the intersection can be identified.

For example, as shown in FIG. 6, if the vehicle turns left, goes straight, or turns right after traveling through the direction-specific traffic information acquisition section 71 and passing through the intersection A, the entry link of direction-specific probe information 81 to 83 is the link #05. If the vehicle turns left after traveling through the direction-specific traffic information acquisition section 72 and passing through the intersection B, the entry link of direction-specific probe information 84 is the link #07. If the vehicle turns right after traveling through the direction-specific traffic information acquisition section 73 and passing through the intersection C, the entry link of direction-specific probe information 85 is the link #08.

Further, if the vehicle turns left after traveling through the direction-specific traffic information acquisition section 71 and passing through the intersection A, the exit link of the direction-specific probe information 81 is the link #11. If the vehicle turns left after traveling through the direction-specific traffic information acquisition section 72 and passing through the intersection B, the exit link of the direction-specific probe information 84 is the link #21. If the vehicle turns right after traveling through the direction-specific traffic information acquisition section 73 and passing through the intersection C, the exit link of direction-specific probe information 85 is the link #32.

The exit timing is the time at which the vehicle passes through the intersection. Specifically, the exit timing is the travel end time of the unit distance section constituting the unit distance section information last collected within the direction-specific traffic information acquisition section read from the travel history DB 38. For example, as shown in FIG. 6, if the vehicle turns left after traveling through the direction-specific traffic information acquisition section 71 and passing through the intersection A, the exit timing of the direction-specific probe information 81 is 10:02:11.

The section travel time is the time required to travel through the direction-specific traffic information acquisition section. Specifically, the section travel time is the amount of time passed from the travel start time of the unit distance section constituting the unit distance section information first collected to the travel end time of the unit distance section constituting the unit distance section information last collected among the plurality of unit distance section information collected within the direction-specific traffic information acquisition section read from the travel history DB 38. Note that the section travel time may be calculated by adding together the travel times of unit distance sections included in the plurality of unit distance section information collected within the direction-specific traffic information acquisition section read from the travel history DB 38. For example, as shown in FIG. 6, if the vehicle turns left after traveling through the direction-specific traffic information acquisition section 71 and passing through the intersection A, the section travel time of the direction-specific probe information 81 is 2 minutes and 40 seconds.

The sub section travel time is the time required to travel through each sub zone #5 to #1, which divide the direction-specific traffic information acquisition section in the direction of travel starting from sub zone #5 into five generally equidistant sub sections. Specifically, the sub section travel time is the amount of time passed from the travel start time of the unit distance section constituting the unit distance section information collected first to the travel end time of the unit distance section constituting the unit distance section information collected last for each of the sub sections #1 to #5 among the plurality of unit distance section information collected within the direction-specific traffic information acquisition section read from the travel history DB 38. Note that the sub section travel time may be calculated by adding for each of the sub sections #1 to #5 together the travel times of unit distance sections included in the plurality of unit distance section information collected within the direction-specific traffic information acquisition section read from the travel history DB 38.

An example of the five sub sections dividing the direction-specific traffic information acquisition section will be described here using FIG. 5. As shown in FIG. 5, a direction-specific traffic information acquisition section having a length of approximately 500 meters is divided in the direction of travel starting from the sub section #5 into the five sub sections #5 to #1, all of which generally have the same length of approximately 100 meters.

For example, as shown in FIG. 6, if the vehicle turns left after traveling through the direction-specific traffic information acquisition section 71 and passing through the intersection A, the sub section travel time of the direction-specific probe information 81 is 60 seconds for sub section #1, 50 seconds for sub section #2, 20 seconds for sub section #3, 20 seconds for sub section #4, and 10 seconds for sub section #5.

The section congestion degree is the status of partial congestion occurring within the direction-specific traffic information acquisition section. Specifically, the CPU 41 determines that there is partial congestion within a sub section if the sub section travel time of the respective sub sections #1 to #5 is equal to or more than a predetermined travel time (e.g. approximately 40 seconds or more in the case of a general road such as a national or prefectural road), and adds together the lengths of the sub sections with partial congestion. The CPU 41 then stores the length of the sum partial congestion as the section congestion degree in the RAM 42.

For example, as shown in FIG. 6, if the vehicle turns left after traveling through the direction-specific traffic information acquisition section 71 and passing through the intersection A, the sub section travel times of the sub sections #1, #2 in the direction-specific probe information 81 is more than 40 seconds. Therefore, the CPU 41 determines that partial congestion occurred over 200 meters, the total length of the sub sections #1, #2. The CPU 41 thus stores 200-meter partial congestion as the section congestion degree of the direction-specific probe information 81 in the RAM 42.

The through link is a link ID for a link other than the entry link that the vehicle travels through within the direction-specific traffic information acquisition section. Specifically, the link IDs at the travel start times of unit distance section information constituting the plurality of unit distance sections collected within the direction-specific traffic information acquisition section read from the travel history DB 38 are successively and time-sequentially extracted, and link IDs other than the entry link are time-sequentially arranged. Link IDs that constitute through links and are time-sequentially arranged can be used to identify roads traveled by the vehicle within the direction-specific traffic information acquisition section.

For example, as shown in FIG. 6, if the vehicle turns left, goes straight, or turns right after traveling through the direction-specific traffic information acquisition section 71 and passing through the intersection A, the through links of the direction-specific probe information 81 to 83 are the link #04, the link #03, and the link #02. If the vehicle turns left after traveling through the direction-specific traffic information acquisition section 72 and passing through the intersection B, the through link of the direction-specific probe information 84 is the link #06. If the vehicle turns right after traveling through the direction-specific traffic information acquisition section 73 and passing through the intersection C, there is no through link so none are noted for the direction-specific probe information 85.

The lane change status specifies whether the vehicle changed lanes in any of the sub sections #1 to #5 within the direction-specific traffic information acquisition section. Specifically, the occurrence or non-occurrence of lane changes based on image recognition in unit distance sections for which the plurality of unit distance section information is collected within the direction-specific traffic information acquisition section read from the travel history DB 38 is successively and time-sequentially extracted for each sub section #1 to #5. If the vehicle changed lanes in any of the unit distance sections, a note of the lane change in the corresponding sub section is stored in the RAM 42.

For example, as shown in FIG. 6, if the vehicle turns left after traveling through the direction-specific traffic information acquisition section 72 and passing through the intersection B, the lane change status of the direction-specific probe information 84 specifies a lane change in sub section #3. In other words, if the vehicle turns left after traveling through the direction-specific traffic information acquisition section 72 and passing through the intersection B, a lane change is specified in the sub section #3 within the direction-specific traffic information acquisition section 72. On the other hand, when the vehicle passes through the intersections A, C, the lane change status of the direction-specific probe information 81 to 83, 85 specifies no lane change, which indicates that the vehicle did not change lanes in the direction-specific traffic information acquisition sections 71, 73.

Road following specifies whether the vehicle followed a road within the direction-specific traffic information acquisition section. Specifically, the CPU 41 successively and time-sequentially extracts the link IDs at the travel end times of the unit distance sections constituting the plurality of unit distance section information collected within the direction-specific traffic information acquisition section read from the travel history DB 38. The CPU 41 then determines whether all the extracted link IDs define road following in the navigation device map information 37A. Here, road following is defined based on a route number and an angle with respect to the road (link) in the direction of travel. For example, road following is defined as the vehicle traveling along a road (link) where the route number does not change, or a road (link) where the vehicle does not turn more than a predetermined angle in the direction of travel. Information regarding the route numbers and the curve angles of roads are pre-stored per link in the navigation device map information 37A.

For example, as shown in FIG. 6, road following in the direction-specific probe information 81 to 85 specifies that the road was followed, and indicates that the vehicle followed the road within the direction-specific traffic information acquisition sections 71, 72, 73.

Next as shown in FIG. 3, at S14, the CPU 41 reads direction-specific probe information from the RAM 42. Based on data for the lane change status, which constitutes the read direction-specific probe information, the CPU 41 executes determination processing to determine whether the vehicle changed lanes within the direction-specific traffic information acquisition section, that is, to determine whether the data for the lane change status specifies that no lane change occurred. If the vehicle did change lanes within the direction-specific traffic information acquisition section, that is, if the data for the lane change status does not specify that no lane change occurred (YES at S14), the CPU 41 proceeds to the processing at S17.

However, if the vehicle did not change lanes within the direction-specific traffic information acquisition section, that is, if the data for the lane change status specifies that no lane change occurred (NO at S14), the CPU 41 proceeds to the processing at S15. At S15, the CPU 41 reads direction-specific probe information from the RAM 42 and reads data for road following, which constitutes the read direction-specific probe information. The CPU 41 then executes determination processing to determine whether the vehicle followed the road within the direction-specific traffic information acquisition section, that is, to determine whether the data for road following specifies that the road was followed.

If the vehicle did not follow the road within the direction-specific traffic information acquisition section, that is, if the data for road following does not specify that the road was followed (YES at S15), the CPU 41 proceeds to the processing at S17. However, if the vehicle did follow the road within the direction-specific traffic information acquisition section, that is, if the data for road following specifies that the road was followed (NO at S15), the CPU 41 proceeds to the processing at S16.

At S16, the CPU 41 reads direction-specific probe information from the RAM 42, and transmits the direction-specific probe information together with a navigation device identifier ID that identifies the navigation device 2 to the information distribution center 3. Next, at S17, the CPU 41 executes determination processing to determine whether an off signal indicating that the engine is off has been input from an engine ECU (not shown).

If an off signal indicating that the engine is off has not been input from the engine ECU (NO at S17), the CPU 41 executes the processing at S11 onward again. However, if an off signal indicating that the engine is off has been input from the engine ECU (YES at S17), the CPU 41 ends the processing.

The direction-specific probe information storage processing executed by the CPU 11 of the information distribution center 3 will be described next based on FIG. 3. Note that the program shown at S111 to S112 of the flowchart in FIG. 3 is stored in the ROM 13 provided in the information distribution center 3 and is executed by the CPU 11 at predetermined time intervals (e.g. approximately every 0.01 to 0.1 seconds).

First, at S111, the CPU 11 executes determination processing to determine whether the direction-specific probe information (entry link, exit link, exit timing, section travel time, sub section travel time, section congestion degree, through link, lane change status, and road following) and the navigation device identifier ID transmitted from the navigation device 2 at S16 has been received. If the direction-specific probe information has not been received (NO at S111), the CPU 11 ends the processing.

However, if the direction-specific probe information has been received (YES at S111), the CPU 11 stores the received direction-specific probe information in the probe information DB 18 and proceeds to the processing at S112. At S112, the CPU 11 updates the current traffic information 16A, which is information relating to current road congestion or the like, based on the direction-specific probe information stored in the probe information DB 18 and traffic information or the like received from the vehicle information and communication system 5. The CPU 11 then ends the processing.

Note that the CPU 11 may update the current traffic information 16A, which is information relating to current road congestion or the like, at predetermined intervals (e.g. every 30 minutes or every hour) based on the direction-specific probe information stored in the probe information DB 18 and traffic information or the like received from the vehicle information and communication system 5.

When the vehicle passes through an intersection that is stored in the collection target intersection DB 39 and for which direction-specific probe information is collected, the CPU 41 of the navigation device 2 generates a plurality of direction-specific probe information (entry link, exit link, section travel time, sub section travel time, section congestion degree, through link, lane change status, and road following) from a plurality of unit distance section information that is collected within a direction-specific traffic information acquisition section until the vehicle passes through the intersection, the link ID of the entry link traveled before entering the intersection, and the link ID of the exit link traveled after passing through the intersection, and transmits these to the information distribution center 3.

Thus, the CPU 41 of the navigation device 2 can generate direction-specific probe information that can accurately determine the congestion conditions at an intersection in an individual exit direction from the intersection, and transmit the direction-specific probe information to the information distribution center 3.

On the basis of direction-specific probe information received from the navigation device 2, the CPU 11 of the information distribution center 3 can accurately determine direction-specific congestion conditions at each intersection stored in the collection object intersection DB 39, and generate and transmit accurate current traffic information 16A regarding these intersections to each navigation device 2.

The CPU 41 does not transmit direction-specific probe information to the information distribution center 3 when a lane change occurred within the direction-specific traffic information acquisition section or when travel did not follow the road within the direction-specific traffic information acquisition section (e.g. a left or right turn was made), that is, when it is determined that the vehicle did not stay in the lane traveled at the travel start time of the direction-specific traffic information acquisition section. Consequently, it is possible to transmit only direction-specific probe information that accurately reflects the congestion conditions in an individual exit direction at an intersection to the information distribution center 3, which increases the precision of direction-specific probe information transmitted to the information distribution center 3.

To be more specific, if all of the sub sections #1 to #5 in the straight lane are congested and none of the sub-sections #1 to #5 of the left-turn lane are congested, when the vehicle travels in the sub sections #5 to #3 of the straight lane and then changes lanes and travels in the sub sections #2 to #1 of the left-turn lane, it is possible to prevent the information distribution center from erroneously determining partial congestion in the sub sections #5 to #3 of the left-turn lane. Similarly, when the vehicle cuts into the sub section #1 of the straight lane after a lane change or from a direction other than the direction following the road (such as from a link not defined as following the road), it is possible to prevent the information distribution center from erroneously determining that there is no congestion despite the congestion in the sub sections #5 to #2 of the straight lane and consequently determining that the section congestion is shorter than the actual congestion.

If the vehicle did not change lanes within a predetermined distance section (such as a direction-specific traffic information acquisition section) before passing through the intersection, the navigation device 2 determines that the vehicle stayed in the lane traveled at the travel start time of the predetermined distance section. Therefore, whether the vehicle stays in the traveling lane in the predetermined distance section can be reliably determined.

If the vehicle did follow the road within a predetermined distance section before passing through the intersection, the navigation device 2 determines that the vehicle stayed in the lane traveled at the travel start time of the predetermined distance section. Therefore, whether the vehicle stays in the traveling lane in the predetermined distance section can be reliably determined.

Note that in order to determine whether the vehicle stayed in the lane traveled at the travel start time of the direction-specific traffic information acquisition section, it may be determined whether the vehicle changed lanes or followed the road. Alternatively, whether the vehicle stayed in the traveling lane within the direction-specific traffic information acquisition section may be determined based on changes in the vehicle position on the road traveled, the lighting condition of turn signal lights, and the like.

If the CPU 41 determines that the vehicle did not stay in the lane traveled at the travel start time of the direction-specific traffic information acquisition section, the CPU 41 does not transmit direction-specific probe information to the information distribution center 3, which can help reduce communication costs.

Note that the present invention is not limited to the above embodiment, and various improvements and modifications are naturally possible while remaining within the scope of the present invention.

For example, the CPU 41 of the navigation device 2 may transmit direction-specific probe information to the information distribution center 3 when a lane change occurs within the direction-specific traffic information acquisition section, and when the vehicle is no longer following the road within the direction-specific traffic information acquisition section. In other words, the CPU 41 may transmit direction-specific probe information to the information distribution center 3 even though the vehicle did not stay in the lane traveled at the travel start time of the direction-specific traffic information acquisition section.

Figure 7:
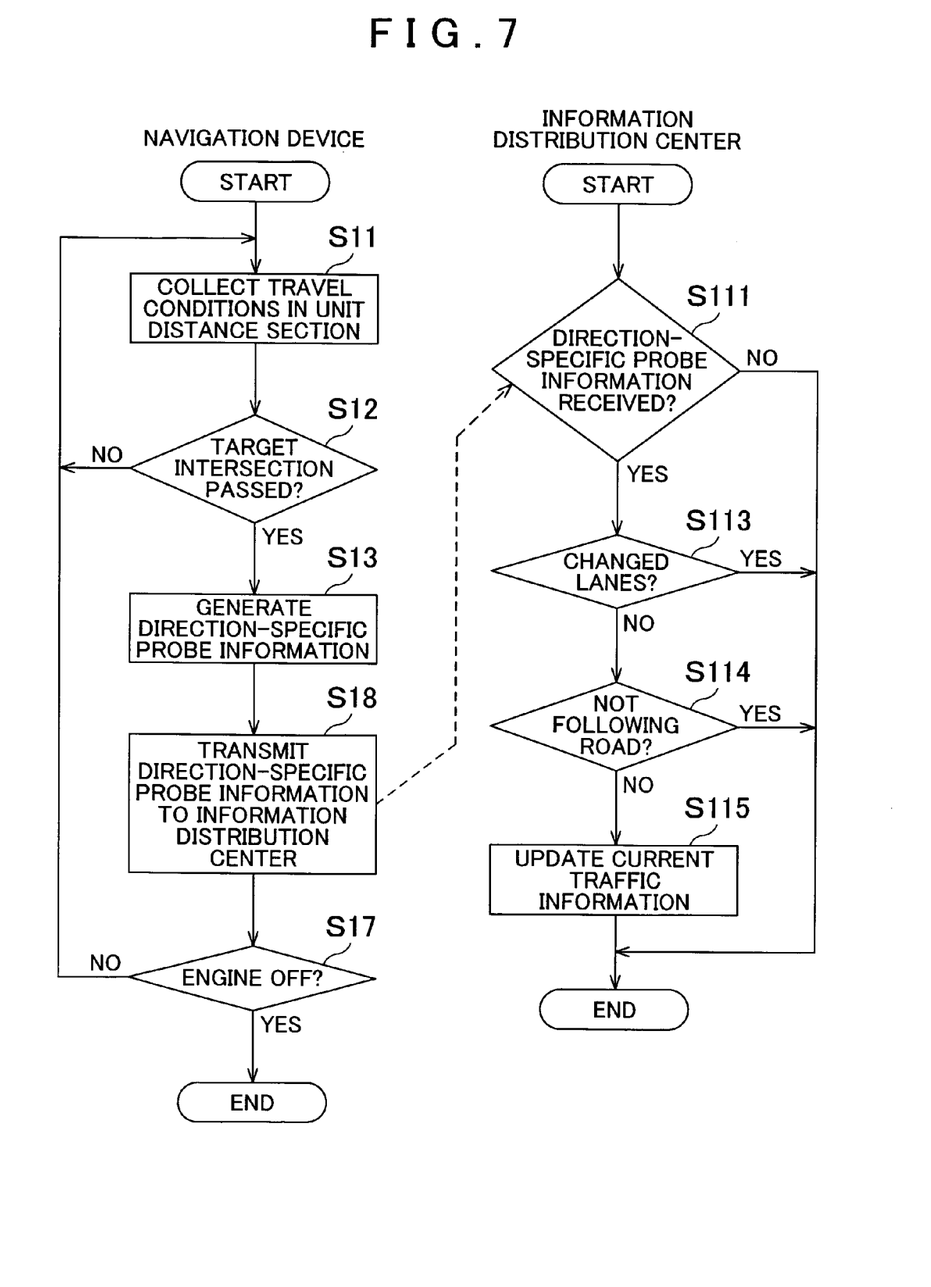
FIG. 7 is a flowchart showing direction-specific probe information transmission processing according to a modification, which is executed by the navigation device installed in the probe car, and direction-specific probe information storage processing according to the modification, which is executed by the information distribution center of the navigation system.

This case will be described with reference to FIG. 7. FIG. 7 is a flowchart showing direction-specific probe information transmission processing according to a modification, which is executed by the navigation device 2 installed in the probe car 6, and direction-specific probe information storage processing according to the modification, which is executed by the information distribution center 3 of the navigation system 1. The overlapping descriptions for steps in the processing of FIG. 7 that are identical to the processing of FIG. 3 are omitted.

At S18, the CPU 41 of the navigation device 2 reads direction-specific probe information stored in the RAM 42 at S13 from the RAM 42, and transmits the direction-specific probe information together with a navigation device identifier ID that identifies the navigation device 2 to the information distribution center 3. At S111, the CPU 11 of the information distribution center 3 executes determination processing to determine whether the direction-specific probe information transmitted from the navigation device 2 has been received. If the direction-specific probe information has been received (YES at S111), the CPU 11 stores the direction-specific probe information in the RAM 12. Next, at S113, the CPU 11 reads direction-specific probe information from the RAM 12. Based on data for the lane change status, which constitutes the read direction-specific probe information, the CPU 11 executes determination processing to determine whether the vehicle changed lanes within the direction-specific traffic information acquisition section, that is, to determine whether the data for the lane change status specifies that no lane change occurred. If the vehicle changed lanes within the direction-specific traffic information acquisition section, that is, if the data for the lane change status does not specify that no lane change occurred (YES at S113), the CPU 11 ends the processing.

However, if the vehicle did not change lanes within the direction-specific traffic information acquisition section, that is, if the data for the lane change status specifies that no lane change occurred (NO at S113), the CPU 11 proceeds to the processing at S114. At S114, the CPU 11 reads direction-specific probe information from the RAM 12. Based on data for road following, which constitutes the read direction-specific probe information, the CPU 11 then executes determination processing to determine whether the vehicle followed the road within the direction-specific traffic information acquisition section, that is, to determine whether the data for road following specifies that the road was followed.

If the vehicle did not follow the road within the direction-specific traffic information acquisition section, that is, if the data for road following does not specify that the road was followed (YES at S114), the CPU 11 ends the processing. However, if the vehicle did follow the road within the direction-specific traffic information acquisition section, that is, if the data for road following specifies that the road was followed (NO at S114), the CPU 11 stores the direction-specific probe information in the probe information DB 18 and proceeds to the processing at S115. At S115, the CPU 11 updates the current traffic information 16A, which is information relating to current road congestion or the like, based on the direction-specific probe information stored in the probe information DB 18 and traffic information or the like received from the vehicle information and communication system 5. The CPU 11 then ends the processing.

As described above, the CPU 11 of the information distribution center 3 does not use the direction-specific probe information when a lane change occurred within the direction-specific traffic information acquisition section or when travel did not follow the road within the direction-specific traffic information acquisition section (e.g. a left or right turn was made), that is, when it is determined that the vehicle did not stay in the lane traveled at the travel start time of the direction-specific traffic information acquisition section. However, the direction-specific probe information may be used as direction-specific probe information with low reliability to generate lane-specific traffic information for each intersection for which direction-specific probe information is collected.

The invention claimed is:

1. A navigation device comprising:
   a vehicle position detection unit that detects a vehicle position;
   a map information storage unit that stores map information;
   a communication unit that communicates with an information distribution center;
   a travel information collection unit that collects travel information for every unit distance section, including vehicle position information at a travel start time of the unit distance section, travel time information for the unit distance section, and travel link information at the travel start time of the unit distance section;
   an intersection passage determination unit that determines whether the vehicle passed through an intersection based on the vehicle position and the map information;
   an exit link identification unit that, when the intersection passage determination unit determines that the vehicle passed through an intersection, identifies an exit link traveled after the vehicle passed through the intersection based on the vehicle position and the map information;
   a probe information generation unit that, when the intersection passage determination unit determines that the vehicle passed through an intersection, generates probe information linked to the travel information collected for every unit distance section included in a predetermined distance section until passage of the intersection, an entry link traveled before entering the intersection that is identified based on the travel information, and the exit link;
   a lane stay determination unit that determines whether the vehicle stayed in the lane traveled at the travel start time of the predetermined distance section throughout the predetermined distance section based on the travel information included in the probe information; and
   a transmission control unit that, the lane stay determination unit determines that the vehicle stayed in the traveling lane throughout the predetermined distance section, executes a control so as to transmit the probe information generated by the probe information generation unit to the information distribution center through the communication unit.

2. The navigation device according to claim 1, wherein the lane stay determination unit determines that the vehicle stayed in the traveling lane throughout the predetermined distance section when the lane stay determination unit determines that the vehicle did not change a lane within the predetermined distance section based on the travel information included in the probe information.

3. The navigation device according to claim 2, wherein the lane stay determination unit determines that the vehicle stayed in the traveling lane throughout the predetermined distance section when the lane stay determination unit determines that the vehicle follows a road throughout the predetermined distance section based on the travel information included in the probe information.

4. The navigation device according to claim 1, wherein the lane stay determination unit determines that the vehicle stayed in the traveling lane throughout the predetermined distance section when the lane stay determination unit determines that the vehicle follows a road throughout the predetermined distance section based on the travel information included in the probe information.

5. A probe information transmission method comprising:
detecting a vehicle position;
reading map information;
collecting travel information for every unit distance section, including vehicle position information at a travel start time of the unit distance section, travel time information for the unit distance section, and travel link information at the travel start time of the unit distance section;
determining, with a processor, whether the vehicle passed through an intersection based on the vehicle position and the map information;
identifying, when the processor determines that the vehicle passed through an intersection, an exit link traveled after the vehicle passed through the intersection based on the vehicle position and the map information;
generating, when the processor determines that the vehicle passed through an intersection, probe information linked to the collected travel information for every unit distance section included in a predetermined distance section until passage of the intersection, an entry link traveled before entering the intersection that is identified based on the travel information, and the exit link;
determining, with the processor, whether the vehicle stayed in the lane traveled at the travel start time of the predetermined distance section throughout the predetermined distance section based on the travel information included in the generated probe information; and
executing, when the processor determines that the vehicle stayed in the traveling lane throughout the predetermined distance section, a control so as to transmit the generated probe information to an information distribution center.

6. A computer-readable storage medium that stores computer-executable instructions, comprising the steps of:
detecting a vehicle position;
reading map information;
collecting travel information for every unit distance section, including vehicle position information at a travel start time of the unit distance section, travel time information for the unit distance section, and travel link information at the travel start time of the unit distance section;
determining whether the vehicle passed through an intersection based on the vehicle position and the map information;
identifying, when a determination is made that the vehicle passed through an intersection, an exit link traveled after the vehicle passed through the intersection based on the vehicle position and the map information;
generating, when a determination is made that the vehicle passed through an intersection, probe information linked to the collected travel information for every unit distance section included in a predetermined distance section until passage of the intersection, an entry link traveled before entering the intersection that is identified based on the travel information, and the exit link;
determining whether the vehicle stayed in the lane traveled at the travel start time of the predetermined distance section throughout the predetermined distance section based on the travel information included in the generated probe information; and
executing, when a determination is made that the vehicle stayed in the traveling lane throughout the predetermined distance section, a control so as to transmit the generated probe information to an information distribution center.

7. A traffic information generation device comprising:
a receiver unit that receives probe information from a vehicle for which travel information for every unit distance section is collected, the travel information including vehicle position information at a travel start time of the unit distance section, travel time information for the unit distance section, and travel link information at the travel start time of the unit distance section, with such probe information transmitted each time the vehicle passes through an intersection and linked to the travel information that is collected for every unit distance section included in a predetermined distance section until passage of the intersection, an entry link traveled before entering the intersection that is identified based on the travel information, and an exit link traveled after passing through the intersection;
a lane stay determination unit that determines whether the vehicle stayed in the lane traveled at the travel start time of the predetermined distance section throughout the predetermined distance section based on the travel information included in the probe information; and
a traffic information generation unit that, when the lane stay determination unit determines that the vehicle stayed in the traveling lane throughout the predetermined distance section, generates lane-specific traffic information for the intersection based on the probe information.

* * * * *